US006956590B1

(12) United States Patent
Barton et al.

(10) Patent No.: US 6,956,590 B1
(45) Date of Patent: Oct. 18, 2005

(54) METHOD OF PROVIDING VISUAL CONTINUITY WHEN PANNING AND ZOOMING WITH A MAP DISPLAY

(75) Inventors: Mark Barton, Schaumburg, IL (US); Frank Kozak, Naperville, IL (US)

(73) Assignee: Navteq North America, LLC, Chicago, IL (US)

( * ) Notice: Subject to any disclaimer, the term of this patent is extended or adjusted under 35 U.S.C. 154(b) by 544 days.

(21) Appl. No.: 09/796,229

(22) Filed: Feb. 28, 2001

(51) Int. Cl.$^7$ .............................................. G09G 5/00
(52) U.S. Cl. ..................... 345/684; 345/784; 345/671
(58) Field of Search ........................ 345/684, 784–788, 345/671, 672; 701/209, 210

(56) References Cited

U.S. PATENT DOCUMENTS

| | | | | |
|---|---|---|---|---|
| 5,617,114 A | * | 4/1997 | Bier et al. .................... | 345/634 |
| 5,638,523 A | * | 6/1997 | Mullet et al. ................ | 345/855 |
| 5,867,158 A | * | 2/1999 | Murasaki et al. ............ | 345/785 |
| 5,959,605 A | * | 9/1999 | Gilblom ...................... | 345/671 |
| 6,006,161 A | * | 12/1999 | Katou ......................... | 701/212 |
| 6,061,618 A | * | 5/2000 | Hale et al. .................... | 701/50 |
| 6,163,749 A | * | 12/2000 | McDonough et al. ........ | 701/208 |
| 6,175,801 B1 | * | 1/2001 | Millington ................... | 701/207 |
| 6,178,380 B1 | | 1/2001 | Millington ................... | 701/212 |
| 6,215,491 B1 | * | 4/2001 | Gould .......................... | 345/660 |
| 6,321,158 B1 | * | 11/2001 | DeLorme et al. ............ | 701/201 |
| 6,392,661 B1 | * | 5/2002 | Tankersley ................... | 345/660 |
| 6,396,507 B1 | * | 5/2002 | Kaizuka et al. .............. | 345/661 |
| 6,397,143 B1 | | 5/2002 | Peschke ....................... | 701/208 |
| 6,750,886 B1 | * | 6/2004 | Bergstedt ..................... | 345/784 |
| 2001/0045949 A1 | * | 11/2001 | Chithambaram et al. ... | 345/418 |
| 2002/0042674 A1 | | 4/2002 | Mochizuki et al. .......... | 701/211 |

OTHER PUBLICATIONS

U.S. Appl. No. 09/767,054, filed Jan. 22,2001, entitled "Method of Handling Context During Scaling with a Map Display".

* cited by examiner

*Primary Examiner*—Sumati Lefkowitz
*Assistant Examiner*—Motilewa Good-Johnson
(74) *Attorney, Agent, or Firm*—Frank J. Kozak; Jon D. Shutter; Lawrence M. Koplan

(57) ABSTRACT

A method for providing visual continuity when performing a zooming or panning operation with a graphical map shown on display screen of a computing platform. When a user of the computing platform operates the user interface thereof to perform a zooming or panning operation, a first map view of a first geographic area is replaced with a second map view of a second geographic area, such that at least a portion of the first and second geographic areas overlap. In order to provide visual continuity, a transition view is shown on the display screen of the computing platform between the showing of the first map view and the showing of the second map view. The transition view is shown for several seconds immediately after the user operates the user interface to perform the zooming or panning operation. The transition view shows either the first map view or the second map view. The transition view also includes a boundary line that is overlaid on the map view being shown. The boundary line is located on the map view used for the transition view to show the border of the portion of the other map view which is visible in the map view used for the transition view. The method for providing visual continuity is particularly useful for in-vehicle navigation systems or hand-held devices with small display screens. The method can also be applied to text windows.

17 Claims, 7 Drawing Sheets

(before panning or zooming)

(first step after pan right)

(second step after pan right)

(first step after pan diagonal)

(second step after pan diagonal)

(first step after zooming out)

(second step after zooming out)

(first step zoom-in activated)

(second step zoom-in activated)

(first step with additional zoom-in activated)

(first step of zoom-in with pan right activated)

(first step with alternative shading of new area)

(first step after zooming out with detail carry over)

FIG. 14
(alternative applied
to text windows -
prior to scrolling)

There are various computing platforms that graphically display maps of geographic areas. For example, some in-vehicle navigation systems include a display screen upon which a map of a geographic area can be displayed graphically. In addition, by using appropriate software applications, maps can also be displayed on general purpose computing platforms, such as personal computers and personal digital assistants.

Some computing platforms and applications that display maps graphically include features that allow a user to interact with the map. Various types of user interaction may be supported. Among these types of user interaction is the ability to zoom in or out. When a user zooms in on a map, a sub-portion of the originally displayed map is selected. The user may operate a pointing device for this purpose. Then, a new map is graphically displayed. The new map corresponds to the FIG. 15
(alternative applied
to text windows -
immediately after
scrolling)

user interaction Various types of user interaction be supported. Among these types of user interaction is the ability to zoom in or out. When a user zooms in on a map, a sub-portion of the originally displayed map is selected. The user may operate a pointing device for this purpose. Then, a new map is graphically displayed. The new map corresponds to the geographic area of the selected sub-portion of the originally displayed map. The new map is at a larger scale than the originally displayed map so that new map fills the same area on the display screen of the computing device on which the originally displayed map had been shown.

When a user zooms out on a graphically displayed map, the new map is at a smaller scale that the previously displayed map. The new map corresponds to a geographic area that is larger than the geographic area that corresponds to the

METHOD OF PROVIDING VISUAL CONTINUITY WHEN PANNING AND ZOOMING WITH A MAP DISPLAY

BACKGROUND OF THE INVENTION

The present invention relates to the presentation of map information on a display screen of a computing device, and more particularly, the present invention relates to a way to improve the presentation of map information on a display screen of a computing device when a user pans or zooms the displayed map.

There are various computing platforms that graphically display maps of geographic areas. For example, some in-vehicle navigation systems include a display screen upon which a map of a geographic area can be displayed graphically. In addition, by using appropriate software applications, maps can also be displayed on general purpose computing platforms, such as personal computers and personal digital assistants.

Some computing platforms and applications that display graphical maps include features that allow a user to interact with the map. Various types of user interaction may be supported. Among these types of user interaction is the ability to zoom in or out. When a user zooms in on a map, a sub-portion of the originally displayed map is selected. The user may operate a pointing device for this purpose. Then, a new map is graphically displayed. The new map corresponds to the geographic area of the selected sub-portion of the originally displayed map. The new map is at a larger scale than the originally displayed map so that new map fills the same area on the display screen of the computing device on which the originally displayed map had been shown.

When a user zooms out on a graphically displayed map, the new map is at a smaller scale than the previously displayed map. The new map corresponds to a geographic area that is larger than the geographic area that corresponds to the previously displayed map, such that the geographic area that corresponds to the previously displayed map is only a sub-portion of the geographic area that corresponds to the new map.

Panning is another type of user interaction that is supported by some computing platforms that graphically display maps. When a user "pans" a map, the displayed features are shifted without changing the magnification (i.e., the map scale stays the same). The map can be panned left, right, up, down, or diagonally.

Some computing platforms support smooth panning or zooming. With smooth panning, the graphically displayed map "slides" in an apparently smooth, continuous motion under the control of the user. Likewise, with smooth zooming, the map scale changes in a smooth continuous motion. On computing platforms that do not support smooth panning or zooming, the panning or zooming operations occur as abrupt, discrete jumps, i.e., the old map view is displayed, and then the new map view replaces it.

When a user interacts with a graphically displayed map by panning or zooming, there is a need for the user to be re-oriented to the graphically displayed map after the panning or zooming operation. The user may have known his/her relationship to the view shown prior to panning or zooming. In order to know his/her relationship to the view displayed after panning or zooming, the user needs to know the relationship between the prior displayed map and the new map. Knowing the relationship between the map views before and after panning and zooming can be difficult, especially on computing platforms that do not support smooth panning and zooming. Even on computing platforms that support smooth panning and zooming, it is sometimes difficult to know the relationship between the map views before and after panning and zooming.

Accordingly, there is a need for an improved way to represent map features when panning and zooming.

SUMMARY OF THE INVENTION

To address these and other objectives, the present invention comprises a method for providing visual continuity when performing a zooming or panning operation with a graphical map shown on display screen of a computing platform. When a user of the computing platform operates the user interface thereof to perform a zooming or panning operation, a first map view of a first geographic area is replaced with a second map view of a second geographic area, such that at least a portion of the first and second geographic areas overlap. In order to provide visual continuity, a transition view is shown on the display screen of the computing platform between the showing of the first map view and the showing of the second map view. The transition view is shown for several seconds immediately after the user operates the user interface to perform the zooming or panning operation. The transition view includes either the first map view or the second map view. The transition view also includes a boundary line that is overlaid on the map view being shown. The boundary line is located on the map view used for the transition view to show the border of the portion of the other map view which is visible in the map view used for the transition view. For example, if the second map view is used for the transition view, the boundary line is rendered on the second map view showing the border of the portion of the first map view which is visible in the second map view. On the other hand, if the first map view is used for the transition view, the boundary line is rendered on the first map view showing the border of the portion of the second map view which is visible in the first map view. The method for providing visual continuity is particularly useful for in-vehicle navigation systems or hand-held devices with small display screens. The method can also be applied to text windows.

BRIEF DESCRIPTION OF THE DRAWINGS

FIGS. 14 and 15 are illustrations of the display screen showing application of an alternative embodiment to text windows.

DETAILED DESCRIPTION OF THE PRESENTLY PREFERRED EMBODIMENTS

I. Definitions

The "old view" refers to the way a map is graphically displayed on a computing platform before a zooming or panning operation.

The "new view" refers to the way a map is graphically displayed on a computing platform after a zooming or panning operation.

II. First Embodiment

The first embodiment provides visual continuity when panning or when zooming out. According to this embodiment, when performing a zooming or panning operation, visual continuity is provided by modifying the display in two steps. These two steps are performed in sequence, i.e., one after the other. The first step includes the presentation of a transition view. The transition view lasts several seconds. In this embodiment, the transition view includes the new view, but with the addition of a superimposed rectangle (or line) that corresponds to the boundaries (e.g., borders) of the old view. In the second step, which occurs a few seconds after the first step, the superimposed rectangle (or line) disappears leaving only the new view. The superimposed rectangle, which is shown during the transition view, provides visual continuity so that the user can locate whatever he/she was looking at before the map shifted.

EXAMPLE 1

Figure 1:
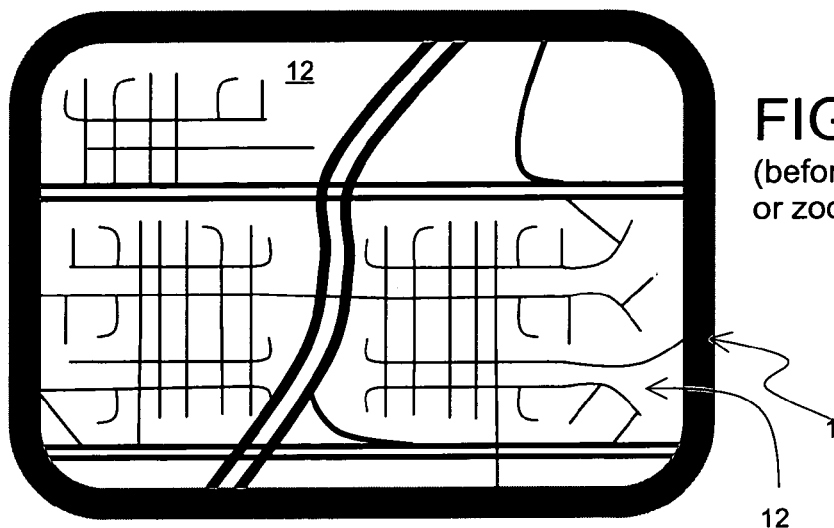
FIG. 1 is an illustration of a display screen of a computing device showing a graphical map of a geographic area before performing a panning or zooming operation according to embodiments of the present invention.
Figure 2:
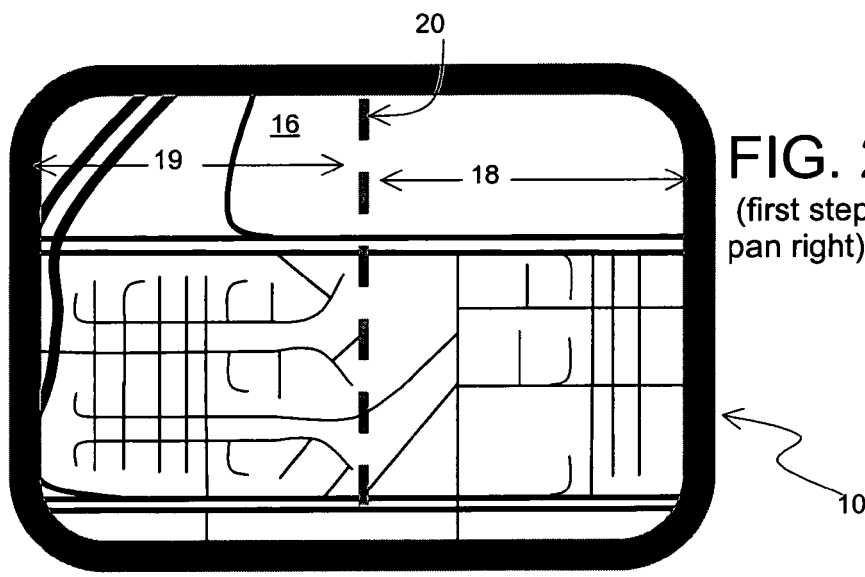
FIG. 2 is an illustration of the display screen shown in FIG. 1 in a first step after performing a horizontal panning operation according to a first example of a first embodiment.

FIG. 1 shows a display screen 10 of a computing device showing a graphical map 12 of a geographic area before performing a panning or zooming operation. Using controls of the computing device, the user pans right. FIG. 2 shows the transition view on the display screen 10 of the computing platform in the first step after the user performs the operation of panning to the right. In the transition view on the display screen 10 is a new graphical map 16. In this case, the new view 16 displays new material on the right side 18 of the screen 10. On the left side 19 of the view 16 on the display screen 10 is a portion of the same material that was visible prior to panning.

In order to provide visual continuity, a boundary line 20 defining the limits of the old view is rendered on the new view 16. Because the panning operation is directly horizontal, the boundary line 20 is a vertical line running from the top of the display screen 10 to the bottom.

Figure 3:
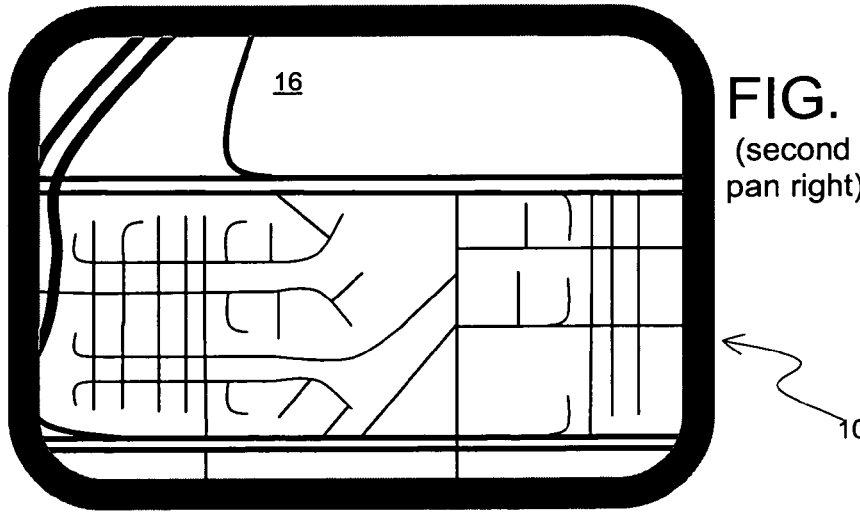
FIG. 3 is an illustration of the display screen shown in FIG. 2 in a second step after performing the horizontal panning operation according to the first example.

FIG. 3 shows the second step of the visual continuity feature. The second step occurs a few seconds (e.g., 2, 3, etc.) after the first step. In the second step, the boundary line 20 disappears. The boundary line 20 can disappear abruptly or gradually fade away. After the boundary line 20 has disappeared, the display screen 10 appears as in FIG. 3. In FIG. 3, the display screen 10 includes the same map view 16 as in the transition view shown in the first step of the operation (shown in FIG. 2), but without the boundary line 20.

EXAMPLE 2

Figure 4:
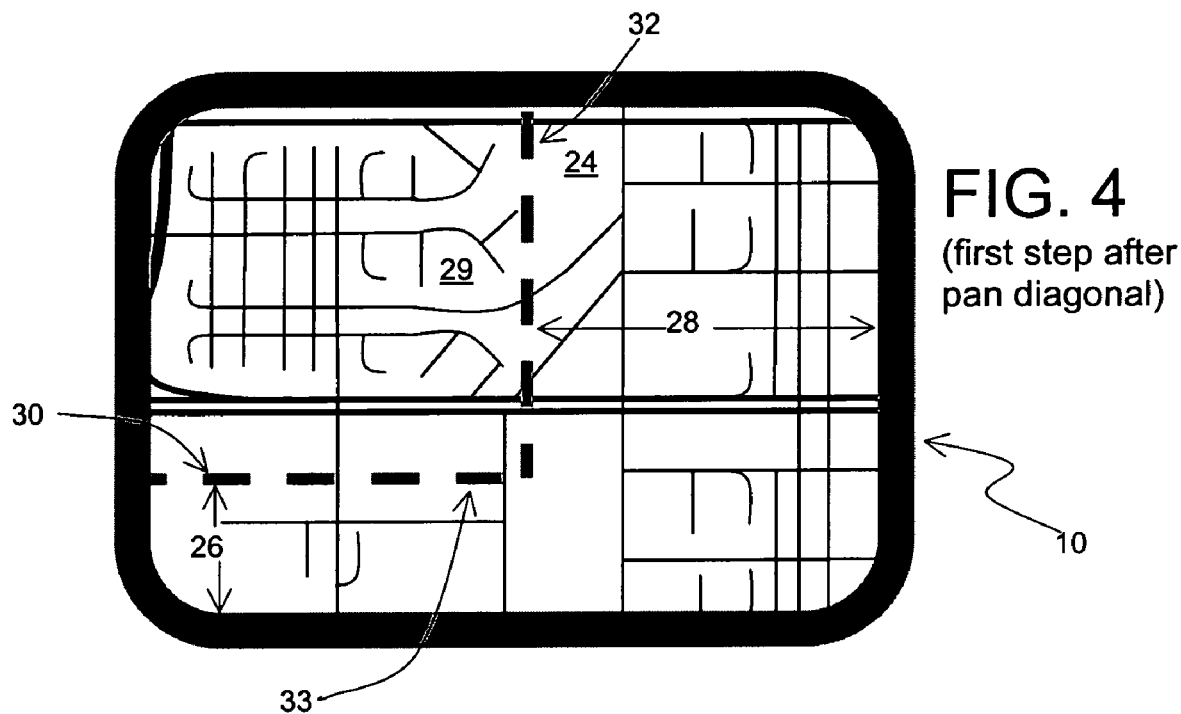
FIG. 4 is an illustration of the display screen shown in FIG. 1 in a first step after performing a diagonal panning operation according to a second example of the first embodiment.

In this second example, the user starts with the same view 12 as shown in FIG. 1. In this second example, the user pans diagonally, toward the lower right. FIG. 4 shows the transition view on the display screen 10 of the computing platform in the first step after the user performs the operation of panning diagonally toward the lower right. In this case, the new view 24 displays new material on both the bottom 26 and on the right 28 of the screen. On the upper left side 29 of the view 24 on the display screen 10 is a portion of the same material that was visible prior to panning.

In order to provide visual continuity, a boundary line 30 defining the limits of the old view is rendered on the new view 24. Because the panning operation is diagonal, the boundary line 30 includes a vertical portion 32 extending from the top of the display screen 10 and a horizontal portion 33 extending from the left side of the display screen 10.

Figure 5:
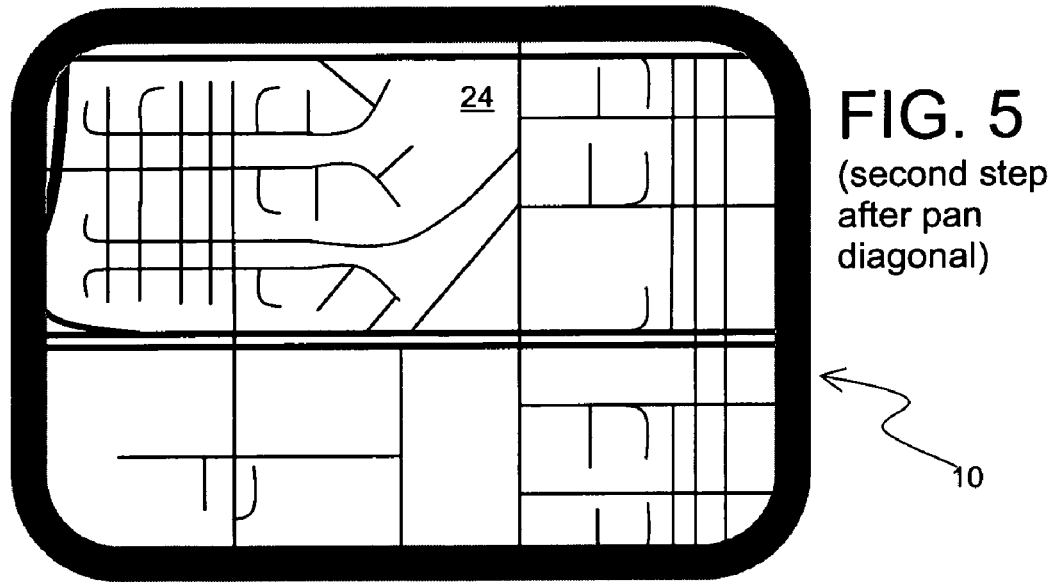
FIG. 5 is an illustration of the display screen shown in FIG. 4 in a second step after performing the diagonal panning operation according to the second example.

FIG. 5 shows the second step of the visual continuity feature in this second example. As described in the prior example, the second step occurs a few seconds after the transition view shown in the first step. In the second step, the boundary line 30 disappears, abruptly or gradually. After the boundary line 20 has disappeared, the display screen 10 appears as in FIG. 5. In FIG. 5, the display screen 10 includes the same map view 24 as in the first step of the operation (shown in FIG. 4), but without the boundary line 30.

EXAMPLE 3

Figure 6:
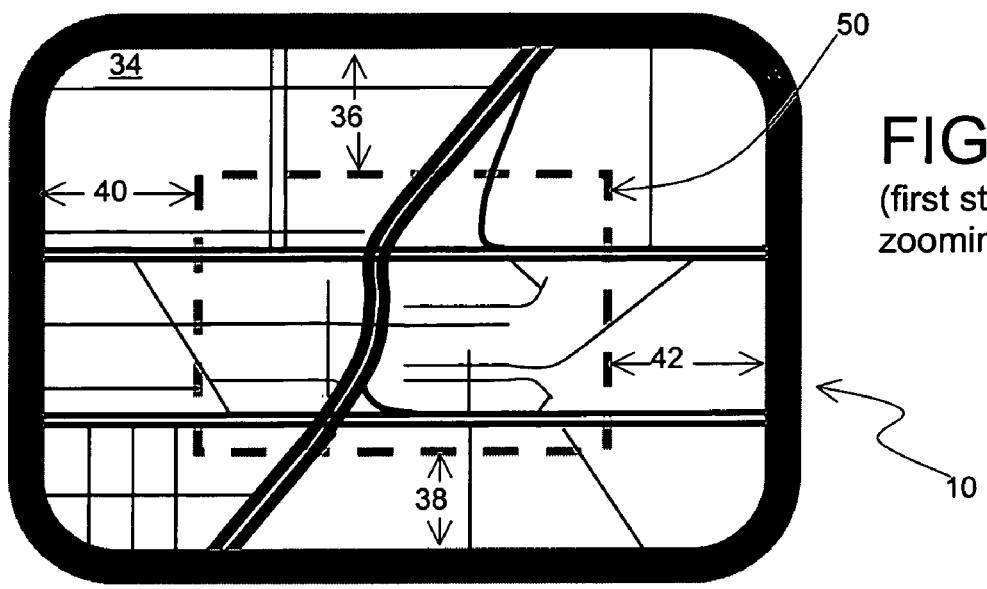
FIG. 6 an illustration of the display screen shown in FIG. 1 in a first step after performing a zooming-out operation according to a third example of the first embodiment.

In this third example, the user starts with the same view 12 as shown in FIG. 1. In this third example, the user zooms out, i.e., decreasing magnification. FIG. 6 shows the transition view on the display screen 10 of the computing platform in the first step after the user performs the operation of zooming out. In this case, the new view 34 displays new material along all four sides, 36, 38, 40, and 42 of the screen. In the central portion of the view 34 on the display screen 10 is a portion of the same material that was visible prior to zooming out.

In order to provide visual continuity, a boundary line 50 defining the limits of the old view is rendered on the new view 34. In this case, the geographic area from the old view is now encompassed in the boundary line 50, which is in the shape of a rectangle within the new view 34.

Figure 7:
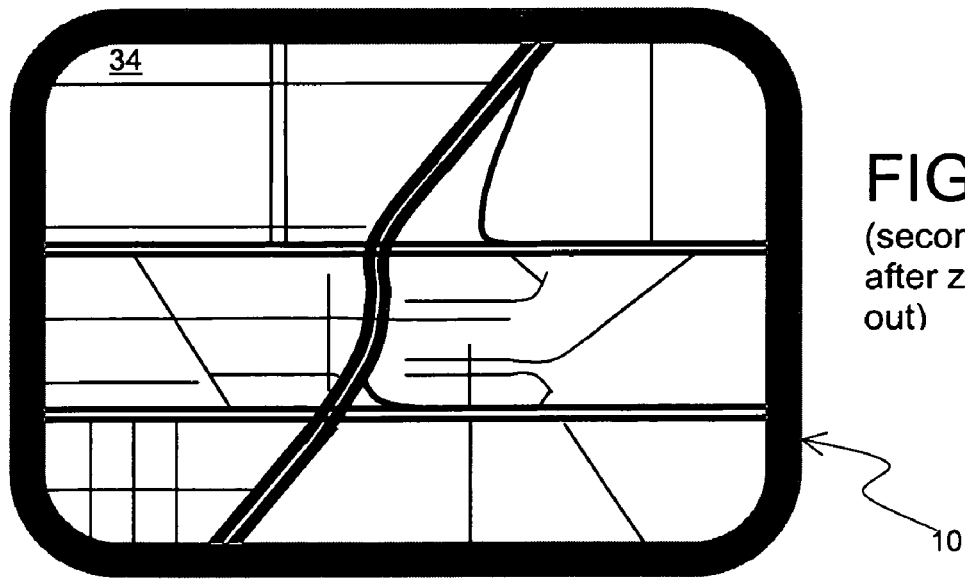
FIG. 7 is an illustration of the display screen shown in FIG. 6 in a second step after performing the zooming-out operation according to the third example.

FIG. 7 shows the second step of the visual continuity feature in this third example. As described in the prior examples, the second step occurs a few seconds after the first step. In the second step, the boundary line 50 disappears, abruptly or gradually. After the boundary line 50 has disappeared, the display screen 10 appears as in FIG. 7. In FIG. 7, the display screen 10 includes the same map view 24 as in the first step of the operation (shown in FIG. 6), but without the boundary line 50.

Note that when zooming out, the new map view (FIG. 6) may have less detail than the old map view (FIG. 1). This means that some smaller roads or other features that are visible in the old map view are not shown in the new map view. This change in level of detail may be disorienting to a user. The present embodiment helps overcome any disorientation the user may experience when there is a change in the level of detail in the second map view.

III. Second Embodiment

The second embodiment provides visual continuity when zooming in. When the user zooms in, none of the boundaries of the old display will appear on the new display, i.e., the old boundaries are "off the screen." Thus, the method for providing visual continuity disclosed in the first embodiment, i.e., overlaying a line in the new view that outlines the boundary of the prior view, is not available. Thus, a different approach is used for providing visual continuity when zooming in. This second embodiment provides for visual continuity when zooming in.

According to this embodiment, the user operates the user interface of the computing platform to perform a zooming-in operation. In a first step of this embodiment for providing visual continuity when zooming in, the old view remains on the display screen immediately after the user operates the user interface to perform the zooming-in operation. In this embodiment, the transition view is rendered on the old view. In the first step, the boundaries of the new view (i.e., the zoomed-in area) are overlaid on the old view for a short time, e.g., 2, 3, seconds. This boundary appears as a rectangle within the old view. After several seconds have elapsed, the display changes to show only the new view.

EXAMPLE 4

Figure 8:
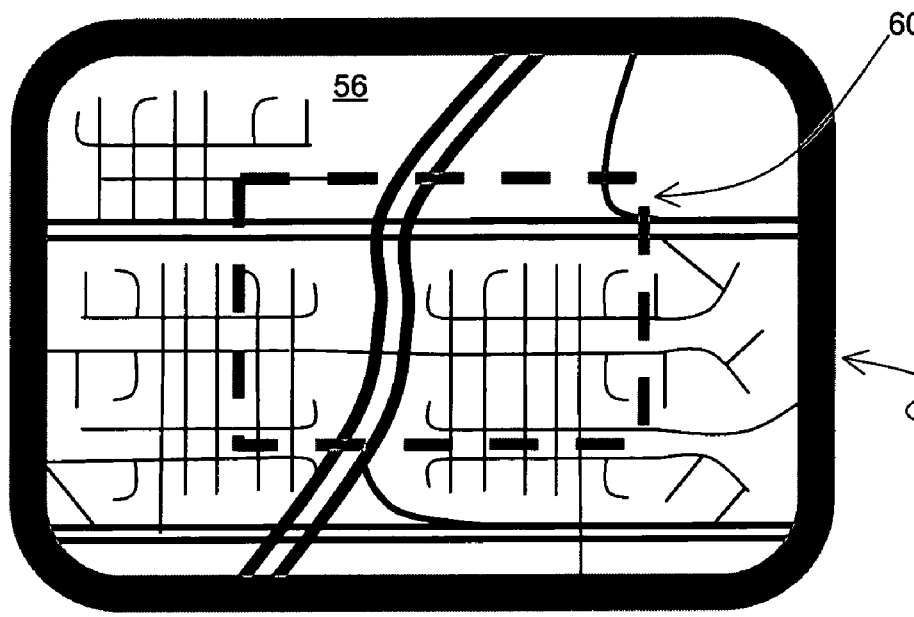
FIG. 8 an illustration of the display screen shown in FIG. 1 in a first step after performing a zooming-in operation according to an example of the second embodiment.

The user starts with the same map view shown in FIG. 1. The user operates the user interface of the computing platform to perform a zooming-in operation. FIG. 8 shows the transition view on the display screen 10 of the computing platform immediately after the user performs the zooming-in operation. On the transition view shown in the display screen 10 in FIG. 8 is a map view 56. The map view 56 shows the same features as the map view 12 shown in FIG. 1. However, in this first step, a boundary line 60 is superimposed on the old map view.

Figure 9:
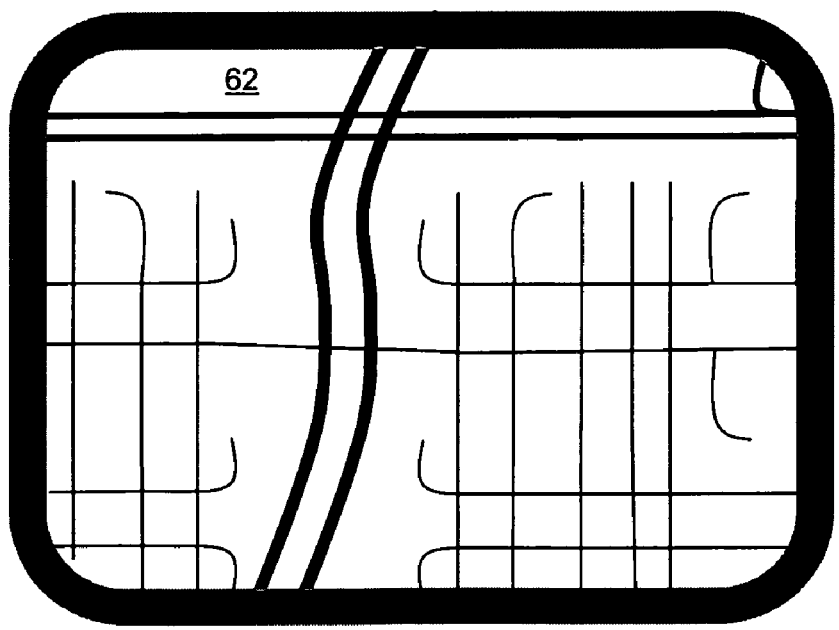
FIG. 9 is an illustration of the display screen in a second step after performing the zooming-in operation shown in FIG. 8 according to the second embodiment.

As in the previous embodiments, after several seconds, the zoomed-in map view replaces the old map view. FIG. 9 shows the new map view 62. The new map view 62 corresponds to the area encompassed within the rectangular boundary line 60 in FIG. 8.

According to a feature of this embodiment, after the boundary of the new view is rendered in the old view, but during the several seconds before the new view is rendered on the display screen, the user has the option to operate the user interface of the computing platform again to perform another zooming-in operation. (The user can perform this additional zooming-in operation more than once.) Each time the user operates the user interface to zoom in more, the rectangle showing the boundary of the zoomed-in area becomes smaller while the map display (i.e., the old view) remains constant.

Figure 10:
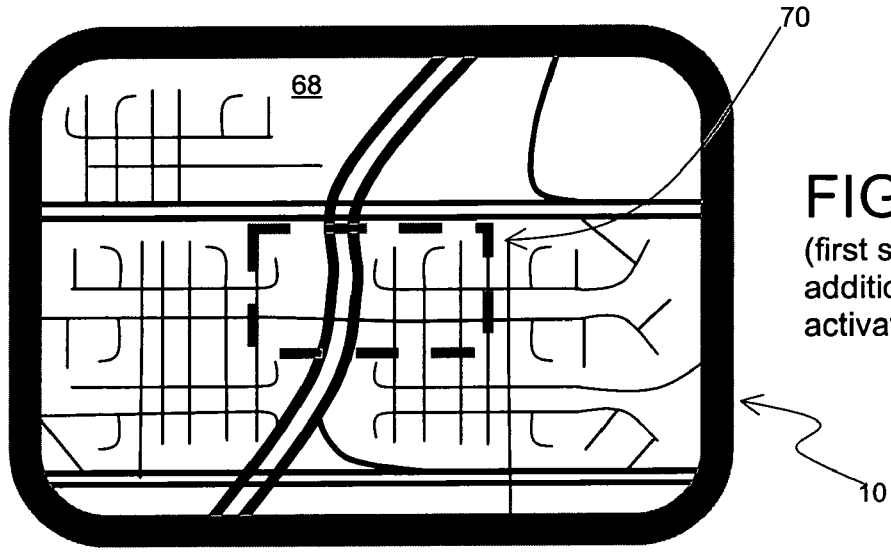
FIG. 10 is an illustration of the display screen shown in FIG. 8 showing another feature of the second embodiment.

FIG. 10 shows an illustration of how this feature would appear if the user operated the user interface to perform another zooming-in operation during the several seconds while the map view 56 (shown in FIG. 8) was on the display screen 10.

FIG. 10 shows a map view 68. This map view 68 shows a map of the same geographic features as in the original map view 12 in FIG. 1. Note that the boundary line rectangle in FIG. 10 is smaller than the boundary rectangle 60 in FIG. 8. If the user did not operate the user interface to change the zoom level again, the next view displayed on the display screen 10 would show the map area encompassed within the boundary rectangle 70 occupying the entire display. In this manner, the user can be provided with a visual cue of the amount by which the map scale will change when the zooming-in operation is performed. The user is also provided with a cue of the relative portion of the old view that will be shown in the new view.

According to another feature of this embodiment, during the transition view while the boundaries of the zoomed-in area are being overlaid on the old view, the user can operate the user interface to perform a zoom-out operation. When the user operates the user interface to perform a zoom-out operation while the boundary of the new view is overlaid on the old view, the rectangle representing the boundary becomes larger. If the user operates the user interface enough times, the overall zoom-in operation may actually become a zoom-out operation. If this occurs, the means for providing visual continuity, as described in the first embodiment, can be used. Using this feature, the user can repeatedly alter the zoom level.

This feature of this embodiment provides some useful advantages. If the user realizes that even a single zoom-in operation goes to far, the user can immediately zoom-out, which effectively cancels the zoom in.

Another advantage occurs when the user performs a zoom-in operation, and then immediately performs another zoom-in operation, and then (based on the feedback provided by the zoom-in rectangle) decides that the second zoom was too much, and so he/she zooms out. In this case, only one re-draw of the screen occurs, rather than three, because the user was able to get immediate feedback about the extent of the zoomed-in area.

As in the other previously described embodiments, once several seconds have elapsed without further operation of the user interface to zoom in or zoom out, the new view is displayed, reflecting the most recently chosen zoom level.

This second embodiment does not necessarily slow the zoom operation. Even though this embodiment imposes a wait of several seconds before the zoomed-in map view is shown, computing platforms that show graphical maps may require at least this amount of time when zooming in, especially if another more detailed layer of the map has to be loaded. The zoom rectangle is drawn on the display screen immediately upon the user's request to zoom. Because this is a relatively easy operation, it can be performed relatively quickly. Meanwhile, the new map layer is loaded, if necessary.

Figure 11:
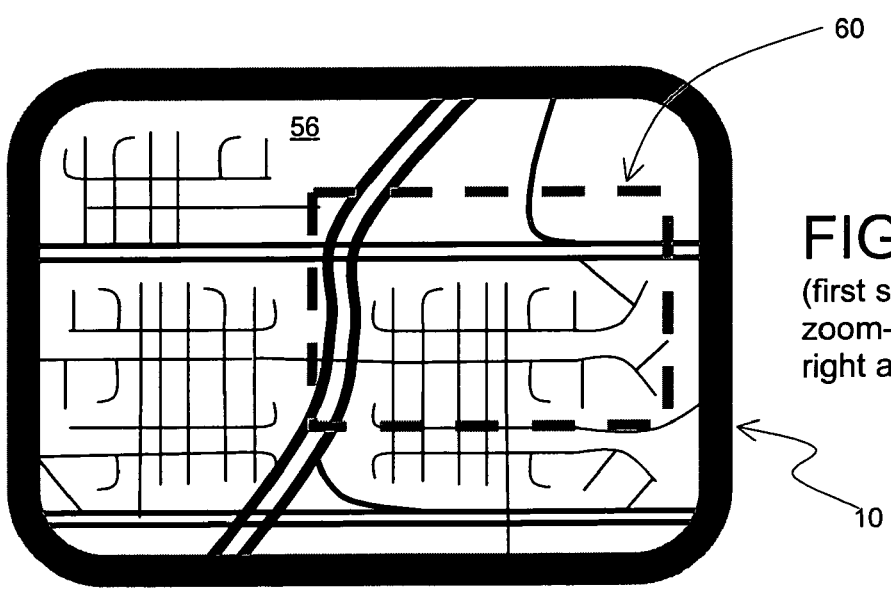
FIG. 11 is an illustration of the display screen shown in FIG. 8 showing still another feature of the second embodiment.

According to another feature of this embodiment, while the boundaries of the zoomed-in area are being overlaid on the old view, the user may operate the user interface to perform a pan operation. When the user operates the user interface to perform a pan operation while the boundary of the new view is overlaid on the old view, the rectangle representing the boundary shifts within the old view. This is illustrated in FIG. 11. Using this feature, the user can zoom in on the desired portion of the old view.

As in the other previously described embodiments, once several seconds have elapsed with further operation of the user interface to pan or zoom, the new view is displayed, reflecting the most recently chosen pan and zoom level.

These examples illustrate that this embodiment serves at least two purposes. First, this embodiment provides visual continuity, as described in connection with the first embodiment. Second, the second embodiment allows the user to alter or speed up his/her interaction with the computing platform by providing immediate visual feedback about the zoomed-in area, so that the user can alter the zoom level, pan, or cancel the zoom operation before the zoom is actually performed.

III. Alternative Embodiments

A. Shading

Figure 12:
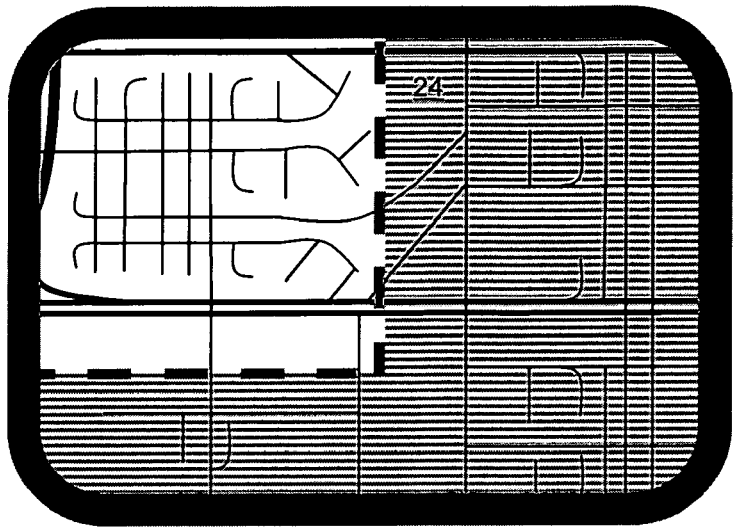
FIG. 12 is an illustration of the display screen shown in FIG. 4 showing a feature of an alternative embodiment.

In the embodiments described above, there is a first step in which a boundary line is rendered that shows the user the border of the old map view with respect to the new map view, i.e., the area inside the boundary line corresponds to the old map view and the area outside the boundary line corresponds to the new map view. One way to provide additional visual continuity for the user is to have the area outside the boundary line grayed or shaded in so that it is darker, though still legible. Then, this shading or graying changes to a normal map display after a few seconds, possibly in conjunction with the disappearance of the boundary line. A gradual fade, over a few seconds, from dark to normal, might be the most attractive visually. This alternative is illustrated in FIG. 12.

B. Text Windows

The same principle of providing visual continuity when panning a graphical map can also be applied to panning (i.e., scrolling) within a text document, such as within a word processor. As a text window is scrolled up or down, the newly displayed text is shown in a different color, which then quickly fades to become the normal text color. This allows the user to rapidly find his/her position in the text after scrolling. An example of this embodiment is shown in FIGS. 14 and 15.

In an alternative version of this embodiment, the text in the new window which had also been displayed in the old window, is shown in the different color and the newly displayed text is shown with the normal color scheme.

C. Carrying Over Level of Detail when Zooming Out

As mentioned above, when zooming out, the new map view may have less detail than the old map view. The first embodiment, described above, helps overcome any disorientation caused by this change in level of detail by providing a boundary line that shows the area corresponding to the old map view within the new map view.

Figure 13:
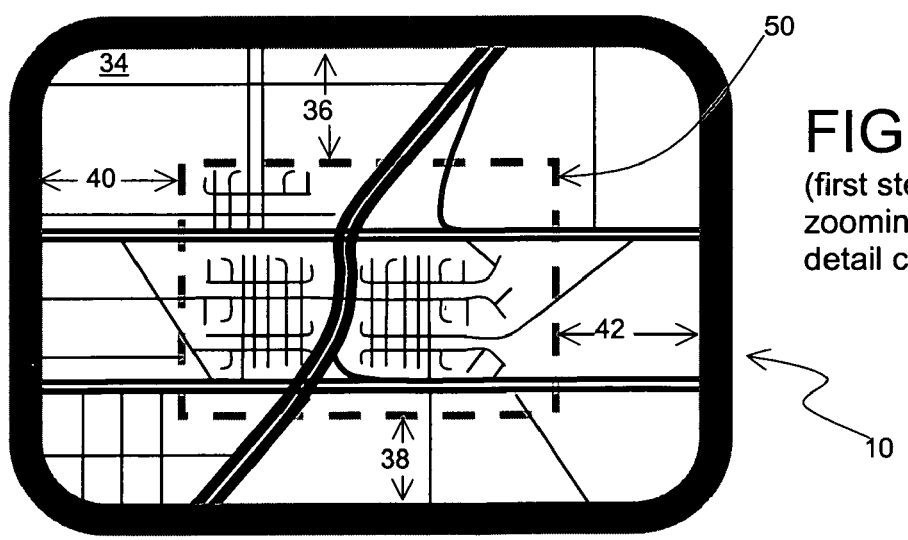
FIG. 13 is an illustration of the display screen shown in FIG. 6 showing a feature of an alternative embodiment.

According to another alternative embodiment, the new map view retains the level of detail with respect to that portion that corresponds to the geographic area shown in the old map view. According to this alternative, the portion of the new map view inside the rectangular boundary line includes the same level of detail, i.e., all the roads and other features, that are shown in the old map view. In other words, the level of detail inside the rectangular boundary line is carried over from the first map view. An example of this feature is shown in FIG. 13. FIG. 13 is similar to FIG. 6 except that the portion inside the rectangular boundary line 50 has the same level of detail as in the first map view (shown in FIG. 1). In FIG. 13, the portion of the new map view located outside the rectangular boundary has the lesser level of detail appropriate for the zoom level of the second map view. After several seconds, the boundary line disappears. When the boundary line disappears, the level of detail of the portion of the second map view located inside the boundary line changes to the same level of detail as the rest of the second map view. When this occurs, the second map view appears the same as in FIG. 7.

IV. Advantages

An advantage of these embodiments is that they allow the user to more rapidly re-orient himself/herself to the new map display, and thereby reduce user error in incorrectly positioning himself/herself with respect to the zoomed or panned map. The same benefits would apply to word processing documents.

The disclosed embodiments are particularly useful for computing platforms that do not support smooth panning or zooming. However, these embodiments can provide advantages even in smooth-panning or smooth-zooming systems, since there is still a need for visual continuity when zooming or panning.

In all cases, the disclosed embodiments help the user re-orient himself/herself after changing the view. This might help overcome some users' reluctance to view maps or to read documents on computer screens.

The embodiments disclosed herein are particularly useful in in-vehicle navigation systems. When a user, such as a driver, uses an in-vehicle navigation system, he/she does not look at the display screen for long, continuous amounts of time. Instead, a vehicle operator may glance briefly at the display. In this type of system, the user is required to obtain sufficient information during such brief glances. The present embodiments afford a way for a user of an in-vehicle navigation system to obtain useful information from only brief glances at a display.

The embodiments disclosed herein are also useful for portable or hand-held computing devices, such as personal digital assistants or portable telephones. These types of devices may have relatively small display screens. The embodiments for providing visual continuity disclosed herein may be particularly helpful on small screen devices.

It is intended that the foregoing detailed description be regarded as illustrative rather than limiting and that it is understood that the following claims including all equivalents are intended to define the scope of the invention.

We claim:

1. A method for providing visual continuity when performing a panning operation with a map display on a display screen of a computing platform, the method comprising the steps of:

displaying a first map view of a first geographic area on the display screen of the computing platform, wherein the first map view is at a first scale;

in response to a user's operation of a user interface of the computing platform to perform a panning operation, displaying a second map view of a second geographic area on the display screen of the computing platform, wherein the second map view is at the first scale, and wherein the second geographic area includes a portion of the first geographic area and a portion not in the first geographic area;

during several seconds immediately upon the displaying of the second map view, rendering a boundary line on the second map view, wherein the boundary line corresponds to a border between the portion of the first geographic area shown in the second map view and the portion of the second geographic area not in the first map view; and after the several seconds, causing the boundary line to disappear.

2. The method of claim 1 wherein the panning operation is diagonal.

3. The method of claim 1 wherein the panning operation is performed on an in-vehicle navigation system.

4. The method of claim 1 wherein the panning operation is performed on a personal digital assistant.

5. The method of claim 1 further comprising:

during the several seconds immediately upon the displaying of the second map view, shading in the second geographic area not in the first map view; and after the several seconds, causing the shading to disappear.

6. A method for providing visual continuity when performing a zooming-out operation with a map display on a display screen of a computing platform, the method comprising the steps of:

displaying a first map view of a first geographic area on the display screen of the computing platform, wherein the first map view is at a first scale;

in response to a user's operation of a user interface of the computing platform to perform a zooming-out operation, displaying a second map view of a second geographic area on the display screen of the computing platform, wherein the second map view is at a second scale which is smaller than the first scale, and wherein the second geographic area includes the first geographic area and a portion not in the first geographic area;

during several seconds immediately upon the displaying of the second map view, rendering a boundary line on the second map view, wherein the boundary line corresponds to a border between the first geographic area shown in the second map view and the portion of the second geographic area not in the first map view; and after the several seconds, causing the boundary line to disappear.

7. The method of claim 6 wherein the zooming operation is performed on an in-vehicle navigation system.

8. The method of claim 6 wherein the zooming operation is performed on a personal digital assistant.

9. The method of claim 6 further comprising:

during the several seconds immediately upon the displaying of the second map view, shading in the portion of the second geographic area not in the first map view; and after the several seconds, causing the shading to disappear.

10. The method of claim 6 wherein the first geographic area shown in the second map view is displayed at a first level of detail immediately upon the displaying of the second map view; and after the several seconds, displaying the first geographic area shown in the second map view at a second level of detail.

11. The method of claim 10 wherein the portion of the second geographic area that is not in the first geographic area is displayed at the second level of detail while the portion of the second map view that is in the first geographic area is displayed at the first level of detail.

12. A method for providing visual continuity when performing a zooming-in operation with a map display on a display screen of a computing platform, the method comprising the steps of:

displaying a first map view of a first geographic area on the display screen of the computing platform, wherein the first map view is at a first scale;

in response to a user's operation of a user interface of the computing platform to perform a first zooming-in operation, displaying a second map view of a second geographic area on the display screen of the computing platform, wherein the second map view is at a second, larger scale, and wherein the first geographic area includes the second geographic area and a portion not in the second geographic area; and during several seconds immediately following the user's operation of the user interface of the computing platform to perform the first zooming-in operation, rendering a boundary line on the first map view, wherein the boundary line corresponds to a border between the portion of the first geographic area shown in the second map view and the portion of the first geographic area not in the second map view.

13. The method of claim 12 further comprising:

in response to the user's operation of the user interface of the computing platform to perform another zooming-in operation during the several seconds immediately upon the user's operation of the user interface of the computing platform, rendering a second, smaller boundary line on the first map view.

14. The method of claim 12 wherein the zooming operation is performed on an in-vehicle navigation system.

15. The method of claim 12 wherein the zooming operation is performed on a personal digital assistant.

16. The method of claim 12 further comprising:

during the several seconds immediately following the user's operation of the user interface of the computing platform to perform the first zooming-in operation, shading in the first geographic area not in the second map view.

17. The method of claim 12 further comprising:

in response to the user's operation of the user interface of the computing platform to perform a panning operation during the several seconds immediately following the user's operation of the user interface of the computing platform to perform a zooming-in operation, shifting the boundary line on the first map view.

* * * * *